United States Patent [19]

Groshens et al.

[11] Patent Number: 4,990,392

[45] Date of Patent: Feb. 5, 1991

[54] THERMO-ADHESIVE TEXTILE PRODUCT COMPRISING A MICRO-ENCAPSULATED CROSS LINKING AGENT

[75] Inventors: Pierre Groshens, Peronne; Christian Paire, Roisel, both of France

[73] Assignee: Lainiere de Picardie, S.A., Peronne, France

[21] Appl. No.: 549,646

[22] Filed: Jul. 6, 1990

Related U.S. Application Data

[63] Continuation of Ser. No. 292,228, Jan. 6, 1989, abandoned.

[30] Foreign Application Priority Data

Jan. 8, 1988 [FR] France .................... 88 00143

[51] Int. Cl.$^5$ .............. A41D 27/00; A41D 27/06; B32B 3/10; B32B 7/14
[52] U.S. Cl. ............................ 428/196; 2/97; 2/272; 428/198; 428/200; 428/320.2; 428/321.5; 428/349
[58] Field of Search ............... 2/97, 272; 428/196, 428/198, 200, 320.2, 321.5, 349

[56] References Cited

U.S. PATENT DOCUMENTS

| | | | |
|---|---|---|---|
| 3,922,418 | 11/1975 | Lauchenauer | 428/200 |
| 3,937,859 | 2/1976 | Carra et al. | 428/198 |
| 4,076,881 | 2/1978 | Sato | 428/200 |
| 4,438,533 | 3/1984 | Helele | 428/198 |
| 4,483,974 | 11/1984 | Grogler et al. | 528/44 |
| 4,486,902 | 12/1984 | Sakai | 428/198 |
| 4,874,655 | 10/1989 | Groshent | 428/200 |

FOREIGN PATENT DOCUMENTS 126978  5/1988  Japan ........................ 2/97

*Primary Examiner*—James C. Cannon
*Attorney, Agent, or Firm*—Mason, Fenwick & Lawrence

[57] ABSTRACT

A thermo-adhesive textile product of the type comprising a backing fabric and an adhesive layer deposited on its surface with the adhesive layer comprising a thermo-adhesive polymer and a cross linking agent which is isolated from the polymer by micro-encapsulation and freed by external action.

9 Claims, No Drawings

THERMO-ADHESIVE TEXTILE PRODUCT COMPRISING A MICRO-ENCAPSULATED CROSS LINKING AGENT

This application is a continuation of application U.S. Ser. No. 294,228, filed Jan. 6, 1989, and now abandoned.

The invention concerns thermo-adhesive materials usable in the textile industry. They consist of a backing fabric covered with thermo-adhesive polymers.

It more particularly concerns the reinforcing materials intended to be glued to the back of any cloth to improve its strength or increase its stiffness, on fusible interlining fabrics.

The backing fabric of the thermo-adhesive materials can be of various types, woven, knitted or non-woven. The properties required for the reinforcing cloth are determined by the various stages of their manufacture and use.

Once the backing fabric has been made it is covered with the thermo-adhesive product. At present this application is usually dot patterns application done with an engraving cylinder. The thermo-adhesive polymers which are initially in the form of powder or paste are raised to a temperature of about 80° C. to make them melt and stick to the backing. In another method the application is carried out by transfer. In this case the thermo-adhesive powder is deposited in the form of dots on a mat which has been treated to make it non-adhesive. These dots are then transferred to the backing fabric at a lower temperature.

The textile thermo-adhesive product obtained during the first stage is then stored at ambient temperature. The various layers of the product should not stick to each other. This means that the product should not be tacky. In other words, once it has returned to ambient temperature the textile product should not be adhesive.

The thermo-adhesive textile product is then used by makers who apply it to the garment and glue the reinforcing material to the cloth using presses operating at temperatures between 120° C. and 180° C. and pressures between a few decibars and a few bars for relatively shorts periods of 10 to 30 seconds. During this stage the polymers of the textile product should once again become adhesive. However they should not have too low a viscosity during this operation otherwise the polymers will go through the backing fabric or the cloth itself causing marks which make the products obtained useless.

Finally, the finished clothes and cloths with reinforcing material should be able to withstand various methods of use and washing. The gluing carried out in the previous stage should be able to stand up to very difficult ambient conditions.

Many attempts have been made to develop products which satisfy the various demands resulting from all the stages mentioned above.

Pursuant upon this one suggestion was to make an adhesive consisting of two or more layers of polymers with different physical characteristics. By carefully choosing the viscosity and the fusion temperature of these various layers it is possible to limit the soaking through and back. However, this technique has been found to be extremely difficult to execute.

The method of depositing the thermo-adhesive material on the textile substrate by what is called "transfer" makes it possible to avoid excessive penetration of the adhesive material into the textile substrate.

It has also been suggested that a thermo-adhesive product should be deposited on the textile substrate and that it should be made thermo-setting by the action of a cross linking agent put into contact with it later.

Consequently the purpose of this invention is to produce a thermo-adhesive textile product, which can be used as reinforcing cloth and which can be glued on without soaking through or back, and stands up to use, and especially to products used for cleaning clothes.

Microencapsulation process which enables a product to be incorporated within a support medium is already known. By this means products incorporated are not in direct contact with their environment. Microencapsulation has been applied in the pharmaceutical, agro-food and bio-medical technology fields.

The American patent, U.S. Pat. No. 4,483,974, describes a process for making microcapsules containing isocyanates and capable of release by the melting of the capsule outer case when the latter is heated to above 100° C.

The purpose of the invention is to make a thermo-adhesive product satisfying all the requirements mentioned above and whose composition can be changed depending on the various textiles with which it is to be used.

The heat sealant product is of the type comprising a backing fabric and an adhesive layer deposited on its surface. The adhesive layer comprises a thermo-adhesive layer and a cross linking agent. According to the invention the cross linking agent is isolated from the polymer by microencapsulation.

The invention will be better understood after reading the following description and studying the examples given.

Due to its use the product of the invention has to keep its thermo-plastic properties right up to the final gluing on the garment. It is desirable that this gluing be permanent. In order to solve this problem, it appears desirable that the thermo-plastic and thermo-adhesive polymer be modified during gluing so that it becomes thermo-setting. As is already known, this change can be obtained by the action of a cross linking agent.

According to the invention the cross linking agent is incorporated into the thermo-adhesive layer of the thermo-adhesive product at manufacture, and is only released during the final gluing.

This effect is obtained by isolating the cross linking agent by microencapsulation. The microcapsules are completely mixed into the thermo-adhesive polymers and the cross linking agent is released by an outside action which can be an increase in temperature or in pressure. The micro-encapsulation process is selected in such a way as to cause this liberation to take place in normal gluing conditions, that is to say temperature between 130° C. and 150° C. or pressures over two bars.

Consequently the adhesive layer can be subjected to various commonly used processes for spreading it on the backing fabric. For example, the textile support can be covered with adhesive using a photo-engraving cylinder. The mixture of these ingredients initially in a paste form is then brought up to a temperature of about 90° C. which enables it to change to the liquid state. In this state its mouldability is sufficient for it to adhere to the backing fabric.

According to another process which has been found to be very effective, the layer of adhesive is deposited evenly in dot patterns forms on a non-adhesive mat called a transfer mat. This layer is then transferred at a temperature lower than that at which it liquifies onto the backing fabric. This latter process enables the penetration of the carrier textile by the adhesive to be avoided while still providing good adherence.

After cooling, the thermo-adhesive product is no longer adhesive or tacky and so can be stored easily.

When gluing onto the garment or cloth, the thermo-adhesive product is raised to a temperature of about 130° C. and a pressure of about three bars.

Two phenomena then take place simultaneously, on the one hand the thermo-adhesive polymer liquifies under the effect of temperature and on the other, the action of the cross linking agent makes it thermo-setting.

These two phenomena have opposing effects on the viscosity and the correct choice of the respective speeds of these two reactions enables this viscosity to be controlled. In this way it is possible to make the adhesive layer sufficiently liquid for it to wet the material, for example the face cloth intended to receive the thermo-adhesive product, and thus ensure the gluing, without having too low a viscosity and consequently soaking throught the cloth or soaking back on its carrier.

The viscosity and its variation in relation to temperature depends on the combination of ingredients in the adhesive layer and their proportions. It is possible to introduce into this layer a catalyst whose concentration contributes to the determination of the speed of the reaction produced when the cross linking agent is activated. Adjusting the concentration of this catalyst alone then enables the viscosity of the layer to be controlled and the desired effect obtained.

The variation microencapsulation processes can be used to obtain the result of the invention.

The microencapsulation can be achieved by using micro-capsules which are spherical particles comprising a solid case containing the cross linking agent. In this way each micro-capsule is a reservoir system.

It is also possible to create micro-spheres which are particles which are also spherical but which are made up of a continuous network of the carrier material in which the cross linking agent is dispersed.

Release of the cross linking agent can be obtained by pressure. In this case the micro-capsules can be created by interfacial polycondensation between the monomers, for example isocyanate monomers or acid chlorides and an amino-acid monomer. Polymerization techniques also provide possibilities of micro-encapsulation which are perfectly satisfactory. These methods make it possible to create a relatively rigid capsule which breaks at a given pressure.

The cross linking agent can also be liberated by raising the temperature, that is by fusion of the micro-capsules or micro spheres. These can be obtained either by simple or complex coaservation or also by solvent evaporation. The two reactions enable this viscosity to be controlled. In this way it is possible to make the adhesive layer sufficiently liquid for it to wet the material, for example the garment or cloth intended to receive the thermo-adhesive product, and thus ensure the gluing, without having too low a viscosity and consequently soaking through the cloth or soaking back on its carrier.

The viscosity and its variation in relation to temperature depends on the combination of ingredient in the adhesive layer and their proportions. It is possible to introduce into this layer a catalyst whose concentration contributes to the determination of the speed of the reaction produced when the cross linking agent is activated. Adjusting the concentration of this catalyst alone then enables the viscosity of the layer to be controlled and the desired effect obtained.

Many microencapsulation processes can be used to obtain the product of the invention.

The microencapsulation can be achieved by using microcapsules which are spherical particles comprising a solid case containing the cross linking agent. In this way each microcapsule is a reservoir system.

It is also possible to create micro-spheres which are particles which are also spherical but which are made up of a continuous network of the carrier material in which the cross linking agent is dispersed.

Release of the cross linking agent can be obtained by pressure. In this case the microcapsules can be created by interfacial polycondensation between the monomers, for example isocyanate monomers or acid chlorides and an amino-acid monomer. Polymerization techniques also provide possibilities of micro-encapsulation which are perfectly satisfactory. These methods make it possible to create a relatively rigid capsule which breaks at a given pressure.

The cross linking agent can also be liberated by raising the temperature, that is by fusion of the micro-capsules or micro spheres. These can be obtained either by simple or complex coaservation or also by solvent evaporation. The cross linking agent is then wrapped in a thermoplastic polymer which melts at the required temperature. The polymer used should preferably be inert in relation to the cross linking agent. Polyolefins are well adapted to this use and can have melting points between 190° and 200° C.

The microcapsules can also consist of a thermoplastic polymer case insensitive to the cross linking agent, and inside which there is also a gas, isobutane for example. Under the effect of heat the pressure increases until the casing breaks. In this way the cross linking agent is released.

Thermo-adhesive polymers which can be used are mostly those which are normally used with spreaders. These can be copolyamides, copolyesters, polyethylenes, ethyl vinyl acetates, vinyl chlorides, or polyurethanes, for example. The polymers best suited for this type of application are those which present a high level of functional groupings on the polymeric chain and which are capable of reacting with the cross linking agents. This is the case of ethyl-acrylic acid polycopolymers, graft polyolefins, ethyl-acrylic ester thermopolymers, maleic anhydride, acrylic polyurethanes and vinyl acrylics.

Cross linking can be obtained either by cross linking agents such as polyfunctional isocyanates, polyfunctional aziridinylethene, formaldehyde melanine resins, phenolformaldehyde derivitives, zirconium zinc complexes, polyamines and polyethylenimines.

Or by thermal polymerization agents, derived from peroxyde or a product capable of breaking a connection homolytically in order to give the free radicals capable of initiating radical polymerization.

Or finally they can be agents for irradiation polymerization such as photoinitiaters or monomers or vinyl acrylic olygomers or derivatives.

The backing fabric can be of various types commonly used in textile adhesives, knitted, woven ou non-woven.

The invention makes it possible to obtain adhesion and great strength for plastic or metal carriers on many textile materials, both draper's cloth and any other textiles.

In an application example, a thermo-adhesive product can be obtained by distributing the adhesive by dot patterns over a tripling cloth following a 17 mesh weave using an engraving cylinder. The adhesive layer will be made using a pasty mix comprising:

55 parts by weight of a 1.4% solution of ammonium polyacrylate, 4 parts by weight of stearic acid, very finely spread, 38 parts by weight of copolyamide powder having a grain size less that 100 microns and a melting point of 90° C.

3 parts by weight of micro-capsules containing isocyanates and able to be freed by melting of the capsulecas as from 100° to 110° C. This type of micro-capsule can be obtained by the process described in the U.S. Pat. No. 4,483,974.

The weight/area of the wet part thus obtained after spreading is about 40 g/m². The thermo-adhesive product is then subjected to drying in an oven set to 95° C. and the weight/area of the wet part falls to 20 g/m². When gluing onto a susbtrate on a thermo-adhesive press operating at a temperature of about 140° C., the isocyanates held in the micro-capsules are freed and the cross linking of the polymer takes place. In this way while heating up the adhesive layer passes throught a liquid state which enables the substrate to be wet, and then under the effect of the cross linking it becomes thermo-setting, thus ensuring permanent and high quality adhesion.

I claim:

1. A textile fabric-bondable, thermo-adhesive product comprising a backing fabric and an adhesive layer made up of dot patterns deposited on its surface, the adhesive layer comprising a thermo-plastic polymer and a cross linking agent for its thermoplastic polymer wherein the cross linking agent is isolated from the thermoplastic polymer by heat- or pressure-releasable micro-encapsulation.

2. Thermo-adhesive product according to claim 1 characterized in that the adhesive layer includes a catalyst whose concentration contributes to determine the speed of the reaction produced when the cross linking agent is released and activated.

3. Thermo-adhesive product according to claim 1 characterized in that the speed of the cross linking reaction is arranged so that when it is subjected to a temperature of about 130° C. the adhesive layer passes quickly through an adhesive state and then becomes thermo-setting.

4. Thermo-adhesive product according to claim 1 characterized in that the cross linking agent is isolated in micro-spheres.

5. Thermo-adhesive product according to claim 1 characterized in that the cross linking agent is released by a rise in temperature.

6. Thermo-adhesive product according to claim 1 characterized in that the cross linking agent is freed by an increase in pressure.

7. Thermo-adhesive product according to claim 1 characterized in that the thermo-adhesive polymer is a copolyamide.

8. Thermo-adhesive product according to claim 1 characterized in that the thermo-adhesive polymer is a polyester.

9. Thermo-adhesive product according to claim 1 characterized in that the cross linking agent is an aziridine.

* * * * *